US010360617B2

(12) United States Patent
High et al.

(10) Patent No.: US 10,360,617 B2
(45) Date of Patent: Jul. 23, 2019

(54) AUTOMATED SHOPPING APPARATUS AND METHOD IN RESPONSE TO CONSUMPTION

(71) Applicant: Walmart Apollo, LLC, Bentonville, AR (US)

(72) Inventors: Donald R. High, Noel, MO (US); Henry P. Sampara, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 420 days.

(21) Appl. No.: 15/135,325

(22) Filed: Apr. 21, 2016

(65) Prior Publication Data
US 2016/0314514 A1    Oct. 27, 2016

Related U.S. Application Data

(60) Provisional application No. 62/152,699, filed on Apr. 24, 2015.

(51) Int. Cl.
*G06Q 30/00* (2012.01)
*G06Q 30/06* (2012.01)
*G06Q 10/08* (2012.01)

(52) U.S. Cl.
CPC ....... *G06Q 30/0635* (2013.01); *G06Q 10/087* (2013.01); *G06Q 30/0631* (2013.01); *G06Q 30/0641* (2013.01)

(58) Field of Classification Search
CPC ........... G06Q 30/0631; G06Q 30/0635; G06Q 30/0641; G06Q 10/087
See application file for complete search history.

(56) References Cited

U.S. PATENT DOCUMENTS 6,204,763 B1 * 3/2001 Sone ................. A47G 29/141
221/2
6,295,423 B1 * 9/2001 Haines ............... B41J 2/17509
399/24
(Continued)

FOREIGN PATENT DOCUMENTS

CN    202993745    6/2013
CN    203024532    6/2013
(Continued)

OTHER PUBLICATIONS

"A Food Management System Based on IOT for Smart Refrigerator," by RuiChun Hou, Xi Wang, and XiaoYing Wang, Applied Mechanics and Materials, vols. 427-429 (2013), pp. 2936-2939 (Year: 2013).*
(Continued)

*Primary Examiner* — Anne M Georgalas
(74) *Attorney, Agent, or Firm* — Fitch, Even, Tabin & Flannery LLP (57) ABSTRACT

Methods and apparatuses are provided for use in tracking product consumption. Some embodiments provide a product purchasing apparatus comprising: a transceiver; a control circuit; and a memory coupled to the control circuit and storing computer instructions that when executed by the control circuit cause the control circuit to: receive multiple product data from a restockable customer product storage unit located at a customer residence; evaluate each of the multiple product data relative to one or more thresholds within a continuously updated customer profile; identify one or more products to be replenished as a function of the continuously updated customer profile; automatically cause a purchase, on behalf of the customer, of at least a first product to replenish at least one of the one or more products
(Continued)

to be replenished; and obtain payment from a source associated with the customer.

16 Claims, 2 Drawing Sheets

(56) References Cited

U.S. PATENT DOCUMENTS

| | | | |
|---|---|---|---|
| 6,829,520 B1 | 12/2004 | Green | |
| 7,120,595 B2 | 10/2006 | Alexander | |
| 7,130,814 B1* | 10/2006 | Szabo | G06Q 30/0201 705/26.8 |
| 7,340,414 B2* | 3/2008 | Roh | G06Q 20/203 340/595 |
| 7,424,447 B2* | 9/2008 | Fuzell-Casey | G06Q 30/02 705/26.8 |
| 7,448,546 B2 | 11/2008 | Jung | |
| 7,475,026 B2 | 1/2009 | Rock | |
| 7,650,298 B2* | 1/2010 | Godlewski | G06Q 10/087 705/28 |
| 7,716,086 B2 | 5/2010 | Anderson | |
| 7,774,239 B2 | 8/2010 | Prescott | |
| 7,930,221 B2* | 4/2011 | Brown | G06Q 10/087 705/28 |
| 8,234,178 B1 | 7/2012 | Rempe | |
| 8,275,665 B2* | 9/2012 | Bodin | G06Q 10/087 235/440 |
| 8,345,282 B2* | 1/2013 | Nishimi | G06Q 10/087 340/5.9 |
| 8,374,925 B2* | 2/2013 | Liamos | G06F 19/3456 705/28 |
| 8,446,462 B2 | 5/2013 | Shahraray | |
| 8,583,512 B1* | 11/2013 | Gupta | G06Q 30/06 705/26.1 |
| 8,606,645 B1 | 12/2013 | Applefeld | |
| 8,756,122 B2 | 6/2014 | Lowenstein | |
| 8,924,262 B2 | 12/2014 | Shuster | |
| 8,963,956 B2 | 2/2015 | Latta | |
| 9,134,675 B2* | 9/2015 | Yang | G03G 15/556 |
| 9,135,849 B2 | 9/2015 | Herger | |
| 9,196,140 B1 | 11/2015 | De La Broise | |
| 9,255,813 B2 | 2/2016 | Liu | |
| 9,262,781 B2 | 2/2016 | Mackinnon | |
| 9,606,238 B2 | 3/2017 | Carter | |
| 9,672,791 B2 | 6/2017 | Kapinos | |
| 9,691,114 B2* | 6/2017 | Ashrafzadeh | G06F 19/3462 |
| 9,967,320 B2 | 5/2018 | Brune | |
| 2001/0034636 A1* | 10/2001 | Ikemura | G06Q 10/087 705/28 |
| 2001/0045449 A1* | 11/2001 | Shannon | A47G 29/141 232/19 |
| 2002/0116301 A1 | 8/2002 | Chapman | |
| 2004/0056948 A1 | 3/2004 | Gibson | |
| 2005/0149414 A1 | 7/2005 | Schrodt | |
| 2006/0146012 A1 | 7/2006 | Arneson | |
| 2006/0229950 A1 | 10/2006 | Pabbisetty | |
| 2008/0183599 A1* | 7/2008 | Hill | G06Q 10/087 705/28 |
| 2009/0182499 A1 | 7/2009 | Bravo | |
| 2009/0319178 A1 | 12/2009 | Khosravy | |
| 2010/0079676 A1 | 4/2010 | Kritt | |
| 2010/0102930 A1* | 4/2010 | Mccoy | G06F 19/3462 340/5.92 |
| 2010/0249990 A1* | 9/2010 | Tsao | G05B 19/418 700/218 |
| 2011/0036671 A1 | 2/2011 | Mckay | |
| 2011/0157471 A1 | 6/2011 | Seshadri | |
| 2011/0213664 A1 | 9/2011 | Osterhout | |
| 2011/0254932 A1 | 10/2011 | Doung | |
| 2012/0047023 A1 | 2/2012 | Kruglick | |
| 2012/0099255 A1 | 4/2012 | Lee | |
| 2012/0136741 A1* | 5/2012 | Agarwal | G06Q 10/00 705/26.1 |
| 2012/0212499 A1 | 8/2012 | Haddick | |
| 2012/0278190 A1* | 11/2012 | Brown | G06Q 10/087 705/21 |
| 2013/0036048 A1 | 2/2013 | Campos | |
| 2013/0226727 A1 | 8/2013 | Serra | |
| 2013/0268317 A1 | 10/2013 | Mattila | |
| 2013/0275300 A1 | 10/2013 | Killian | |
| 2013/0346168 A1 | 12/2013 | Zhou | |
| 2014/0002357 A1 | 1/2014 | Pombo | |
| 2014/0129328 A1 | 5/2014 | Mathew | |
| 2014/0154382 A1 | 6/2014 | Green | |
| 2014/0172640 A1 | 6/2014 | Argue | |
| 2014/0195383 A1* | 7/2014 | Kim | G06Q 30/0633 705/26.62 |
| 2014/0214547 A1 | 7/2014 | Signorelli | |
| 2014/0244289 A1 | 8/2014 | Lowenstein | |
| 2014/0244768 A1 | 8/2014 | Shuman | |
| 2014/0252091 A1 | 9/2014 | Morse | |
| 2014/0279291 A1* | 9/2014 | Brosnan | G06Q 10/087 705/28 |
| 2014/0336723 A1 | 11/2014 | Ben-Ezra | |
| 2015/0019342 A1 | 1/2015 | Gupta | |
| 2015/0105880 A1 | 4/2015 | Slupik | |
| 2015/0149298 A1 | 5/2015 | Tapley | |
| 2015/0227882 A1* | 8/2015 | Bhatt | G06Q 10/083 705/330 |
| 2015/0234372 A1 | 8/2015 | Slupik | |
| 2015/0302510 A1* | 10/2015 | Godsey | G06Q 30/0635 705/26.81 |
| 2015/0312348 A1 | 10/2015 | Lustgarten | |
| 2016/0026009 A1 | 1/2016 | Urbajs | |
| 2016/0071149 A1 | 3/2016 | Farshori | |
| 2016/0140526 A1 | 5/2016 | Cummins | |
| 2016/0146614 A1 | 5/2016 | Gupta | |
| 2016/0162715 A1* | 6/2016 | Luk | F25D 29/005 235/385 |
| 2017/0039617 A1 | 2/2017 | Wind, III | |
| 2017/0213185 A1 | 7/2017 | Putcha | |
| 2018/0060949 A1 | 3/2018 | Mattingly | |

FOREIGN PATENT DOCUMENTS

| | | |
|---|---|---|
| CN | 103604271 | 2/2014 |
| CN | 103776231 | 5/2014 |
| WO | 2013074232 | 5/2013 |
| WO | 2013189183 | 12/2013 |
| WO | 2014010784 | 1/2014 |
| WO | 2014016212 | 1/2014 |
| WO | 2014070814 | 5/2014 |
| WO | 2014123528 | 8/2014 |

OTHER PUBLICATIONS

"Chips with everything: your groceries are wired to the Web. Your clothes are talking to each other. Tiny smart tags are about to find their way onto everything you buy, and the results will change your life," by Jonathan Fildes, New Scientist 176.2365: 44(4) (Oct. 19, 2002.) (Year: 2002).*
Acquity Group, LLC; "The Internet of Things: The Future of Consumer Adoption"; Published in 2014; 11 Pages.
WiseGEEK; "What is a Smart Refrigerator"; http://www.wisegeek.com/whatisasmartrefrigerator.htm; Jan. 17, 2015; 4 Pages.
Williams, D.; "Device Stops Grocery Cart Thieves in Their Tracks"; May 7, 1999; Associated Press via LA Times; pp. 1-3.
Bharti Airtel; My Airtel APP; Scrreenshots from My Airtel APP; Retrieved on Dec. 13, 2016; 7 pages.
PCT; App. No. PCT/US2017/013872; International Search Report and Written Opinion dated Mar. 23, 2017.
PCT; App. No. PCT/US2017/048598; International Search Report and Written Opinion dated Nov. 6, 2017.
Turbonet; "Mobile Application in Retail"; http://turbonet.co.in/index.php?route=information/information&information_id=21; Retrieved on Oct. 28, 2015; pp. 1-7.
UKIPO; App. No. GB1613079.1; Combined Search Report under Section 17(5)(b) and Abbreviated Examiniation Report under Section 18(3) dated Jan. 26, 2017.

(56) References Cited

OTHER PUBLICATIONS

UKIPO; App. No. GB1613079.1; Office Action dated Nov. 7, 2018.
USPTO; U.S. Appl. No. 15/410,347; Office Action dated Sep. 21, 2018.
USPTO; U.S. Appl. No. 15/690,649; Office Action dated Aug. 22, 2018.

* cited by examiner

AUTOMATED SHOPPING APPARATUS AND METHOD IN RESPONSE TO CONSUMPTION

RELATED APPLICATIONS

This application claims the benefit of U.S. Provisional Application No. 62/152,699, filed Apr. 24, 2015, which is incorporated in its entirety herein by reference.

TECHNICAL FIELD

These teachings relate generally to shopping facilities and more particularly to devices, systems and methods for assisting customers in acquiring products.

BACKGROUND

Shopping facilities typically stock products for purchase by customers. Customers generally enter the shopping facility having one or more items they intend to purchase. The customers travel through the shopping facility to locate the one or more products.

Upon locating the desired products the customer takes the one or more products to a checkout register or other point of sale. Each item is charged and the customer pays for the items. It is typically up to the customer to identify products to purchase, and to acquire and pay for the products desired.

BRIEF DESCRIPTION OF THE DRAWINGS

Disclosed herein are embodiments of apparatuses and methods pertaining to providing multiple customers with a cooperative shopping experience. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Customers of a shopping facility and/or source for consumable products are often caught off guard when a product stored at a customer's residence (e.g., in the refrigerator, in a pantry, etc.) is fully consumed, a product expires, food becomes usable, or other such conditions. Further, customers are often uncertain as to what is stored in their refrigerator or other such storage unit, whether a product has expired, how much of a product is left to be consumed, and the like. Some embodiments track product consumption over time and can automatically purchase products on a customer's behalf. Further, some embodiments provide a customer with guidance regarding consumable products they have purchased and/or that are stored on or in one or more product storage units. Still further, some embodiments can provide the customer with information regarding what is stored and/or status information about one or more products.

Figure 1:
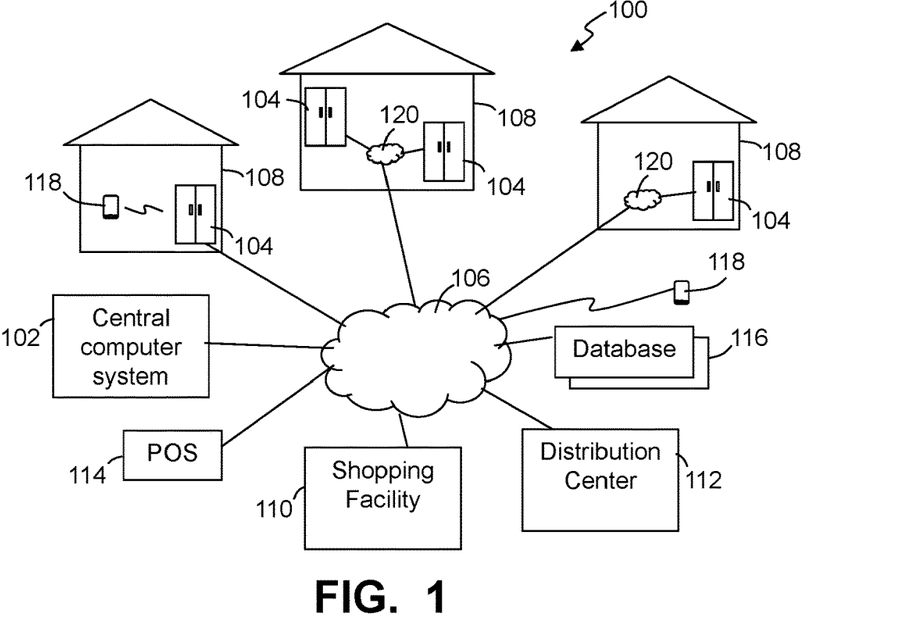
FIG. 1 illustrates a simplified block diagram of an exemplary system providing cooperative communication to allow for automated shopping on behalf of multiple distinct and separate customers, in accordance with some embodiments.

FIG. 1 illustrates a simplified block diagram of an exemplary system 100 providing cooperative communication to allow for automated shopping on behalf of multiple distinct and separate customers, in accordance with some embodiments. A central product tracking and automatic product purchasing system or central product tracking system 102 (referred to below as the central product tracking system) of such a product tracking system is in communication through one or more a wired and/or wireless distributed communication networks 106 (e.g., WAN, LAN, Internet, cellular, other such networks, and combinations of such networks), with multiple different product storage units 104 located at numerous different customer's residences 108 and/or businesses that are geographically distributed. It is noted that more than one product storage unit may be included at a single residence or business. In some implementations the central product tracking system 102 is further in communication with one or more shopping facilities and/or shopping facility inventory systems 110, distribution center inventory systems 112, point of sales (POS) systems 114 (which may be within or part of systems of the shopping facility and/or the distribution center), and/or other systems. In other implementations, the central product tracking system may be part of a computer system at a shopping facility or distribution center. The central product tracking system may further be in communication with one or more databases 116.

Each of the product storage units 104 is configured receive and temporarily store consumable products. Further, the product storage units are configured to identify the consumable products that are placed within, on or otherwise supported by the product storage units and each time the product is removed. In some instances, as products are removed and returned to a product storage unit 104, the product storage unit continues to identify, track, estimate and/or predict an amount of the product that is consumed over time or identify when a remaining amount of the product drops to or below a threshold corresponding to the product. In some embodiments, the product storage units 104 are further configured to communicate product information, which can include the identification of a product as it is either placed in or removed from the product storage unit, consumption information, and/or the evaluation of consumption relative to the threshold to the central product tracking system 102. Utilizing the product tracking and/or consumption information in cooperation with corresponding customer profile information, the central product tracking system is configured to automatically purchase one or more products to replace products that are being consumed, have been fully consumed and/or are predicted to be fully consumed. Further, the automated purchasing of products is often performed without customer interaction at the time the purchase is made.

The product storage unit includes one or more communication interfaces that allow the product storage unit to communicate the product information. In some instances, the product storage unit communicates over the distributed wired and/or wireless communication network 106. Additionally or alternatively, the product storage unit may communicate via a local wired and/or wireless communication network 120 (e.g., LAN, Wi-Fi, other such networks, and combinations of such networks) to a router (not shown), one or more user interface units (UIU) 118 of a customer, or the like.

Further, the product storage unit may be configured to communication with a user interface unit 118 to provide product information to a customer. The user interface units 118 can be substantially any relevant device configured to allow a user (e.g., customer, shopping facility associate, shopping facility colleague, etc.) to communicate. For example, the user interface units may include but are not limited to smart phones, cell phones, laptops, tablets, computers, shopping facility supplied devices (e.g., carried by a customer, fixed and/or detachably secured with a movable item container, etc.), or other such portable consumer electronic user devices.

Figure 2:
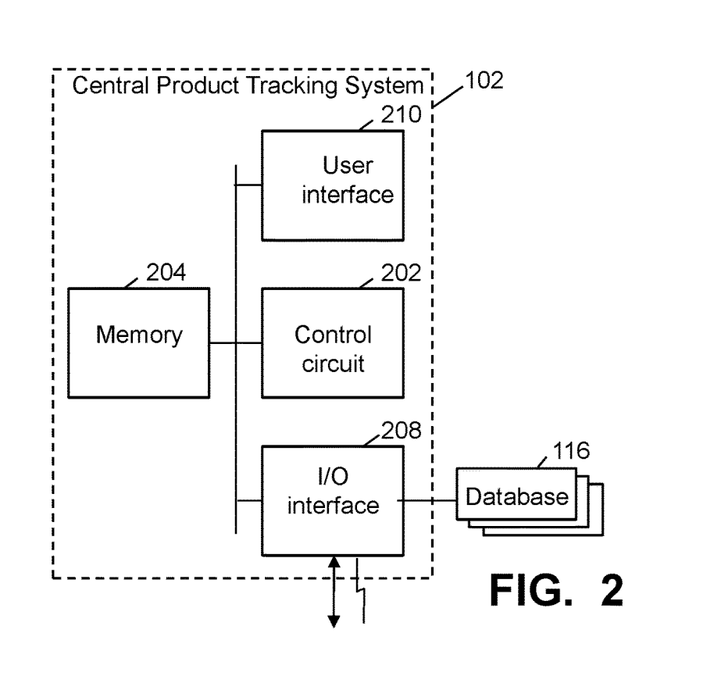
FIG. 2 illustrates a simplified block diagram of an exemplary central product tracking system, in accordance with some embodiments.

FIG. 2 illustrates a simplified block diagram of an exemplary central product tracking system 102, in accordance with some embodiments. As described above, the central product tracking system is configured to receive product information, including at least product consumption information from thousands, hundreds of thousands or more product storage units 104, and automatically initiate purchases of products on behalf of customers to replace products being consumed by the customers and/or otherwise identified as inconsumable. Further, in some instances, the central product tracking system may communicate back to the product storage units 104 and/or to user interface units (UIU) 118 of customers.

The central product tracking system includes a control circuit 202, memory 204, and input/output (I/O) interfaces 208. Further, the central product tracking system 102 typically includes one or more user interfaces 210 configured to allow users to interact with the central product tracking system. In some embodiments, the central product tracking system 102 and/or the control circuit 202 can be implemented through one or more servers operated remote from the customer residences and/or businesses, and product storage units 104. Similarly, the one or more servers may be implemented remote from shopping facilities 110 and/or distribution center. In other implementations, however, some or all of the central product tracking system 102 may be implemented at one or more shopping facilities and/or distribution centers. Further, in some embodiments, the central product tracking system 102 in implemented through a plurality of computers and/or servers that are distributed over one or more communication networks (e.g., the communication network 106), and may be geographically distributed while still being communication coupled to cooperatively operate to perform the functions of the central product tracking system 102.

Further, the central product tracking system 102 may be utilized with a single shopping facility (e.g., such as a store location, shopping mall, retail campus, or the like), while in other implementations, the central product tracking system may extend across multiple shopping facility locations. For simplicity, the embodiments herein are described with respect to a single shopping facility. It will be appreciated by those skilled in the art that some embodiments can be applicable to multiple shopping facilities, and/or the tracking and/or management of products for customers of one or more shopping facilities. Further, the central product tracking system may be operated local at a shopping facility location or remote from the shopping facility location.

The control circuit 202 typically comprises one or more processors and/or microprocessors. The control circuit couples with and/or includes the memory 204. Generally, the memory 204 stores the operational code or set of instructions that is executed by the control circuit 202 and/or processor to implement the functionality of the central product tracking system. In some embodiments, the memory 204 may also store some or all of particular data that may be needed to allow the product tracking, purchasing, and the like. Such data may be pre-stored in the memory or be received, for example, from inventory systems, point of sale systems, shopping facility systems, product storage units, other sources, or combinations of such sources. It is understood that the control circuit may be implemented as one or more processor devices as are well known in the art. Further, the control circuit may be implemented through multiple processors dispersed over the distributed network. Similarly, the memory 204 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 204 is shown as internal to the central product tracking system; however, the memory 204 can be internal, external or a combination of internal and external memory. Additionally, the central product tracking system may include a power supply (not shown) and/or it may receive power from an external source. In some instances, the control circuit 202 and the memory 204 may be integrated together, such as in a microcontroller, application specification integrated circuit, field programmable gate array or other such device, or may be separate devices coupled together. In some applications, the control circuit 202 comprises a fixed-purpose hard-wired platform or can comprise a partially or wholly programmable platform. These architectural options are well known and understood in the art and require no further description here. The control circuit can be configured (for example, by using corresponding programming as will be well understood by those skilled in the art) to carry out one or more of the steps, actions, and/or functions described herein.

The one or more I/O interfaces 208 allow wired and/or wireless communication coupling of the central product tracking system to external components, such as the product storage units 104, databases 116, the user interface units 118, shopping facilities systems 110, distribution center systems 112, point of sale systems 114, and other such components. Accordingly, the I/O interface 208 may include any known wired and/or wireless interfacing device, circuit and/or connecting device, such as but not limited to transceivers, receivers, transmitters, and the like. For example, in some implementations, the I/O interface 208 provides wireless communication in accordance with one or more wireless protocols (e.g., Wi-Fi, Bluetooth, radio frequency (RF), cellular, other such wireless communication, or combinations of such communication). In some implementations, the I/O interface includes one or more transceivers configured to couple with and receive communications from over the distributed communication network 106. Further, in some implementations, the product storage unit 104 is configured to communicate via Bluetooth, Wi-Fi or other local wireless network with a user interface unit 118 that can utilize some or all of the information, act as a relay between the product storage unit and the central product tracking system 102, the user interface unit may identify certain information to communicate to the central product tracking system (e.g., based on internal filter, in response to request from the central product tracking system, etc.), and the like.

One or more user interfaces 210 can be included in and/or coupled with the central product tracking system, and can include substantially any known input device, such one or more buttons, knobs, selectors, switches, keys, touch input surfaces and/or displays, etc. Additionally, the user interface may include one or more output display devices, such as lights, visual indicators, display screens, etc. to convey information to a user, such as status information, history information, product storage identifiers, product information, product identifiers, customer profile information, product consumption information, graphical user interface, purchase information, notifications, errors, conditions and/or other such information. While FIG. 2 illustrates the various components being coupled together via a bus, it is understood that the various components may actually be coupled to the control circuit 202 and/or one or more other components directly.

Figure 3:
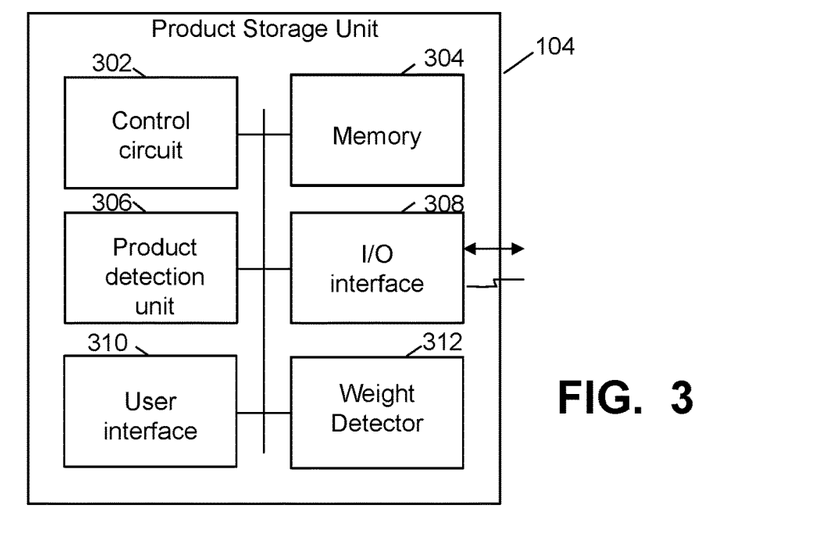
FIG. 3 shows a simplified block diagram of an exemplary product storage unit, in accordance with some embodiments.

FIG. 3 shows a simplified block diagram of an exemplary product storage unit 104, in accordance with some embodiments, and includes one or more control circuit 302, memory 304, input/output (I/O) interfaces 308 and product detector unit 306. Some embodiments further include a user interface 310. Still further, the product storage unit may also include one or more other detectors and/or sensors 312, such as but not limited to one or more weight detectors. In some embodiments, the product storage unit 104 may include one or more location detection systems (e.g., GPS receive).

The control circuit 302 typically comprises one or more processors and/or microprocessors. The memory 304 stores the operational code or set of instructions that is executed by the control circuit 302 and/or processor to implement the functionality of the product storage unit 104. In some embodiments, the memory 304 may also store some or all of particular data that may be used to identify products, store product identification information, store product size and/or quantity information, track product consumption, maintain thresholds, communicate information, and the like. Some such data may be pre-stored in the memory, received from an external source (e.g., the central product tracking system 102), be determined, and/or communicated to the product storage unit, such as from a user interface unit 118, shopping facility, distribution center, other source or combination of such sources. It is understood that the control circuit 302 and/or processor may be implemented as one or more processor devices as are well known in the art. Similarly, the memory 304 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 304 is shown as internal to the product storage unit 104; however, the memory 304 can be internal, external or a combination of internal and external memory. Additionally, the product storage unit typically includes a power supply (not shown) or it may receive power from an external source. While FIG. 3 illustrates the various components being coupled together via a bus, it is understood that the various components may actually be coupled to the control circuit 302 and/or one or more other components directly.

Generally, the control circuit 302 and/or electronic components of the product storage unit 104 can comprise fixed-purpose hard-wired platforms or can comprise a partially or wholly programmable platform. These architectural options are well known and understood in the art and require no further description here. The product storage unit and/or control circuit can be configured (for example, by using corresponding programming as will be well understood by those skilled in the art) to carry out one or more of the steps, actions, and/or functions described herein.

The control circuit 302 and the memory 304 may be integrated together, such as in a microcontroller, application specification integrated circuit, field programmable gate array or other such device, or may be separate devices coupled together. The I/O interface 308 allows wired and/or wireless communication coupling of the product storage unit to external components, such as the central product tracking system 102, user interface units 118, a customer profile system, wired and/or wireless routers, and other such components or systems. Typically, the I/O interface 308 provides at least wireless communication (e.g., Wi-Fi, Bluetooth, cellular, RF, and/or other such wireless communication), and in some instances may include any known wired and/or wireless interfacing device, circuit and/or connecting device, such as but not limited to transceivers, received, transmitters, and the like.

The one or more user interfaces 310 are used for user input and/or output. For example, the user interface 310 may include any known input devices, such one or more buttons, knobs, selectors, switches, keys, touch input surfaces, audio input unit, and/or displays, etc. Additionally, the user interface may include one or more output display devices, such as lights, visual indicators, display screens, touch screens, etc. to convey information to a user, such as but not limited to, product information (e.g., information regarding products stored in/on the product storage unit, product information of products available from a shopping facility, etc.), customer information (e.g., identification, contact information, address, preferences, etc.), shopping or product list information, video content (e.g., video from the a shopping facility, product video information, advertisements, etc.), other communication information (e.g., text messages, emails, etc.), status information, product status information (e.g., identification of products being stored, amount of a product consumed, date product is anticipated to be fully consumed, and the like), operating status information, notifications, alerts, errors, conditions, product recommendations, and/or other such information. Similarly, the user interface in some embodiments may include audio units and/or systems that can receive audio commands or requests verbally issued by a user, and/or output audio content.

The product storage unit 104 further includes one or more product detection units 306 configured to detect products as they are placed in or on the product storage unit 104, removed from the product storage unit, and/or while the products are stored by the product storage unit. Further, the product detection unit 306 is further configured to identify a product and/or determine a product identifier. Typically, the product detection unit distinguishes products from one another based on the determined identifiers. In some embodiments, the product detection unit detects when products are put into (or on) the product storage unit 104 and removed from the product storage unit. The product detection unit can further detect when a new product (i.e., a product that was not recently removed and is being returned to the product storage unit) is placed in the product storage unit, obtains an identifier of the product, and stores the product identification in memory. A date when the product is initially detected is typically also stored in memory. The product detection unit 306 further can track products as they are removed and returned to the product storage unit 104. Further, information received from over the distributed communication network 106 and/or from the user may be used in identifying a product. For example, a new product may be detected, and if an identification cannot be obtained, the product storage unit may query a shopping facility computer system, may query the user through the user interface, access other remote resources, such as user interface units 118, distribution center system 112, databases 116, other sources or a combination of two or more of such sources.

The product detection unit 306 can be configured to communicate to the control circuit 302 the product identifying information of the detected products, and notifications when each product is inserted or removed from the product storage unit. In some embodiments, the control circuit 302 of the product storage unit can utilize this product identification and tracking information to monitor the usage and/or consumption of the products based in part on the removal and insertion of the products into and out of the product storage unit 104. In other embodiments, the product detection unit 306 may be configured to track the consumption of the products through an evaluation of each products removal and insertion. The consumption information can then be communicated to the control circuit 302. As described here, in yet other embodiments, the product storage unit provides product detection information to the central product tracking system that evaluates product consumption and determines when a product is within a threshold of being consumed, fully consumed, expired, etc.

The product detection unit 306 may include one or more detecting devices and/or systems. For example, in some embodiments, the product detection unit includes one or more code readers (e.g., bar code readers), RFID tag readers, cameras, other such detectors or combinations of two or more of such detectors. Again, the product detection unit 306 obtains an identifier of multiple products placed within (or on) the product storage unit and associates the removal and return of the products with their corresponding identifier.

In some embodiments, the product detecting unit notifies the control circuit when a product is placed in the product storage unit, when a product is removed from the product storage unit and when a product is returned to the product storage system. This information is part of a product tracking information used to track consumption (e.g., determine whether a product is within a threshold of being fully consumed). Similarly, the product tracking information can be used to predict or determine a rate of consumption, predict when a product is expected to be completely consumed, whether a product has passed an expiration date, whether a product has been recalled, and other such information.

Again, in some embodiments, the product storage unit 104 may additionally include one or more weight detectors 312 that can measure a weight of a product. The weight information obtained over time can be used by the product storage unit and/or can be forwarded to the central product tracking system 102 allowing one or both the product storage unit and the central product tracking system to track the consumption of the product over time. For example, the product storage unit detects and/or identifies the product as it is returned to the product storage unit, and further detects its weight when the product is placed on one or more weight detectors within the product storage unit. The weight information can be used in part to allow the central computer system to anticipate when the product is expected to be fully consumed. Based on this information, the central product tracking system can further anticipate how long it will take to get a replacement product to the customer (e.g., whether the purchased product is to be delivered, whether the customer is expected to pick up the product, predicted delivery times, whether a product is in stock, etc.), and can automatically initiate a purchase of a replacement product so that the customer does not completely consume the product before the replacement can be received or the replacement is obtained shortly thereafter.

The product tracking information can be communicated to the central product tracking system 102. In some embodiments, the product tracking information includes an identifier of one or more products, when the product was removed, and if returned when the product was returned. One or more thresholds maybe evaluated to identify when the product is determined as having been fully consumed, such as a threshold time period since the removal of the product and the product not being returned within that threshold time period. In some instances, the threshold time period is specific to a given product.

Similarly, utilizing the product identifier, the product storage unit 014 and/or the central product tracking system 102 can identify one or more thresholds corresponding to each product, such as an expected expiration date (which may also be dependent on conditions within the product storage unit, such as a temperature, humidity, etc., that can be forwarded to the central product tracking system), rates of consumption based on previous consumption of the same product, rate of consumption based at least in part on how often the product is removed, average amount of a product consumed when removed, and the like. Further, the central product tracking system 102 is configured to identify when a product is expected to be fully consumed and/or has been fully consumed, and initiate a purchase of a replacement product.

Figure 4:
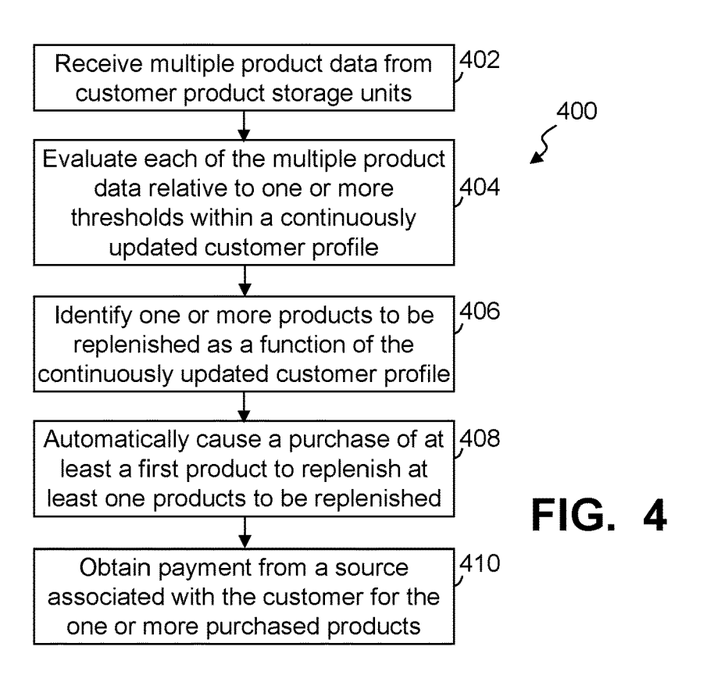
FIG. 4 illustrates a simplified flow diagram of an exemplary process of tracking product consumption, in accordance with some embodiments.

FIG. 4 illustrates a simplified flow diagram of an exemplary process 400 of tracking product consumption, in accordance with some embodiments. In some implementations, some or all of the process 400 is performed by the central product tracking system 102. In step 402, multiple product data is received from the restockable customer product storage unit 104 located at a remote customer residence 108. Typically, the central product tracking system 102 is in communication over the distributed communication network 106 with hundreds, if not tens of thousands or more product storage units 104, and receiving product data from each product storage unit. The product data can include an identifier of the product storage unit, an identifier of a customer associated with the product storage unit, a residence identifier (e.g., address), or other identifying information. For example, a customer may have established a customer account and/or profile, and further associated one or more of her/his product storage units 104 with the account and/or profile. Accordingly, the central product tracking system 102 can distinguish product data received from each of the multiple different product storage units 104. The product data can include substantially any relevant information for one or more products, such as but not limited to one or more of a product identifier, manufacturer identifier, a notification that a product has been consumed, a notification that a predicted or determined threshold amount of the product has been consumed, a date corresponding to when a product was initially received at the product storage unit, an anticipated (or user specified) expiration date of a product, an indicator that a product was removed from the product storage unit, a time a product was removed from the product storage unit, a time a product is returned to a product storage unit, a weight of a product when a product was removed from the product storage unit, a weight of a product when it is returned to the product storage unit, and other such information. In some implementations, the central product tracking system receives multiple product data that each comprise product tracking information corresponding to one of multiple consumable products tracked over time by a customer product storage unit 104.

In some embodiments, the product storage unit identifier and/or customer identifier is used to associate the product data to a particular customer or set of customers (e.g., a family, a husband and wife, roommates, etc.). Each customer or set of customers may have a customer profile that includes information about each customer. In some instances, each customer of a set of customers may have a separate customer profile, while the customer profiles may be linked, cross-referenced, and/or some of the profile information and/or parameters may be shared. The customer profiles include at least relevant information about a customer and information corresponding to products acquired by the customer and/or an associated customer (e.g., a spouse). The profile information can include, for example, one or more addresses, product storage identifiers, product information of products previously purchased, product shopping lists, shopping habits, preferences, payment information (e.g., credit card information, debit card information, bank information, gift card and/or certificate information, refund information, and/or other such payment information), thresholds, and other such information. The customer profile and/or parameters of the customer profile may be provided by a customer (e.g., through a user interface of a Web page, a registration process, one or more software applications on a user interface unit, etc.), incorporated based on customer actions (e.g., purchases, habits, preferences, etc.), provided by third parties (e.g., other shopping facilities, credit card company, bank, etc.), and the like. Further, in many embodiments, the central product tracking system 102, a customer profile system that is communicationally coupled with the central product tracking system, a shopping facility server, a network of shopping facility servers, other such system, or combination of two or more of such systems, can continuously maintain customer profile information, including continuously updating and modifying profile information. For example, the customer profile information can be updated each time a customer or associated customer purchases a product, returns a product, receives or registers a gift card, updates profile information, associates a product storage unit with the customer profile, and other such actions.

In step 404, each of multiple product data corresponding to a product storage unit 104, residence 108, customer, or the like that is associated with a customer profile or set of customer profiles is evaluated relative to one or more thresholds within a continuously updated customer profile associated with the customer residence 108. Again, the customer profile information can be continuously updated. For example, in response to a customer purchasing a product with an expected expiration date, the customer profile information may incorporate an indication of the purchase and the corresponding expiration date. Additionally or alternatively, a customer may designate a threshold, and in some instances, a user designated threshold may override one or more other thresholds. For example, a user may specify an expiration threshold for a product that is one week after a sales expiration date, product distributor designated expiration date, or some other date. Similarly, a customer may set a consumption threshold that corresponds to when a product is anticipated to be fully consumed, such that the consumption threshold expiries prior to when a product is actually anticipated to be fully consumed. For example, a consumption threshold may be set to two days prior to when a product is expected to be fully consumed based on tracked consumption rates, historical consumption rates and the like. The two day threshold can allow time for a customer to receive a replacement to the product prior to or shortly after the product is fully consumed.

In step 406, one or more products of the multiple consumable products are identified that are to be replenished based on the evaluation of each of the product data, as a function of the continuously updated customer profile. The identification of a product to be replenished may also be based on one or more parameters specified in the corresponding customer profile and/or information corresponding to the customer. For example, a customer may have previously authorized certain products to be automatically purchased. Other factors used in evaluating products to determine whether a product is a candidate to be replenished can include a customer's shopping habits, customer preferences, previous and/or standing authorizations, product priorities, available funds for payment, other such factors, and typically a combination of such factors. Similarly, the detection of a product to be replenished and/or automatically purchased may be limited based on one or more factors, such as but not limited to cost, one or more spending limits or thresholds, a limit on or threshold number of a particular product or combination of products, a limit on or threshold number of automated purchases, anticipated visit to a shopping facility by the customer, whether authorization is needed, other such factors, or a combination of two or more of such factors.

In step 408, one or more of the identified products to be replenished are automatically purchased on behalf of the customer associated with the customer residence to replenish one or more of the products identified to be replenished. The automated purchase may include obtaining an authorization from the customer, such as when a purchase exceeds a cost or budget, a customer profile requires an authorization before purchases are completed, and other such factors. The customer profile may further set spending thresholds, quantity thresholds, product priorities, and other such factors that are taken into consideration. These thresholds may be default thresholds, customer specified, learned by the system over time, or the like. For example, a customer may set a spending threshold or budget for automated purchases. A notification may be communicated (e.g., email, text message, etc.) when a spending budget is reached, and/or prior to exceeding a budget. Similarly, multiple different budgets may be specified, such as one or more budgets for customer specified essentials (e.g., milk, orange juice, eggs, etc.), one or more budgets for non-essentials (e.g., cheese, butter, jelly, etc.), one or more budgets for extras (e.g., ice cream, cream cheese, chocolate chips, syrup, etc.), and/or other such varied budgets. Further, product priorities may direct the central product tracking system to prioritize the purchase of one or more products over other products, particularly when costs are approaching or expected to exceed a budget.

In step 410, payment is obtained from a source associated with the customer for one or more products automatically purchased on behalf of the customer. Again, the customer profile may include payment information, such as credit card information, gift card information, debit card information, checking account information, and the like. Some embodiments may include a prequalification and/or registration with the customer providing one or more payment options, and authorizing the shopping facility to make purchases on behalf of the customer. The one or more payment options may include authorization of at least a predefined minimum, which may be dependent on a customer's history with the shopping facility, payment history with the shopping facility and/or other financial institutions (e.g., credit cards, banks, etc.), and other factors. The purchase may further take a payment priority into consideration. For example, a default payment priority or a customer defined payment priority might, for example, specify that gift card credits should be used first, followed by a debit card, and then using a credit card. Similarly, one or more of these payment priorities may not require an express authorization before the purchase is made (e.g., gift card), while authorization may be needed for other payment options (e.g., a customer profile may designate that express authorization is needed for other payment options, a bank may require express authorization, etc.).

In some embodiments, the central product tracking system 102 may further receive a communication from the customer product storage unit 104 of product data corresponding to one or more products purchased (whether automatically purchased or purchased by a customer) that confirms receipt at the product storage unit of one or more products purchased. In some instances, the confirmation from the product storage unit that a purchased product has been placed in or on the product storage unit is in response to a notification to the product storage unit that the particular product has been purchased and should be expected. An expected delivery or receive date may also be provided to the product storage unit and/or a user interface unit 118. For example, in some embodiments, the central product tracking system 102 may cause a notification of the purchase of one or more products to be communicated to the customer product storage unit 104 in response to causing the purchase of the one or more products. The notification identifies the one or more products, and in some instances may provide additional product information, such as but not limited to, a unique product identifier, an expected date of arrival, an expected expiration date, a size or quantity, preferred storage conditions, and the like. Again, in some implementations, replenish product data may be received in response to the notification that the one or more product were purchased, and the customer product storage unit detecting the purchased one or more products being added to the customer product storage unit.

In some embodiments, the central product tracking system 102 and/or a product inventory system in communication with or included with the central product tracking system may recommend one or more products in addition to or as an alternative to a product that has been identified to be replenished. Some implementations, in identifying one or more products to be replenished further identify one or more alternative products available to be purchased as an alternative to purchasing one or more of the products identified to be replenished. As such, in automatically purchasing a product, the purchased product may be one of the recommended alternative products instead of a product identified to be replenished. The purchase of a recommended or alternative product may include a pre-authorization (e.g., based on sales price, based on a preference for the alternative specified in the customer profile, based on previous purchases, or the like), or may need an express authorization prior to proceeding with the purchase of an alternative product. Typically, in identifying one or more alternative products, the central product tracking system may determine, obtain and/or retrieve one or more reasons why each of the one or more alternative products may be purchased as the alternative to purchasing a product identified to be replenished. The alternative may be identified based on one or more factors, such as but not limited to pricing (e.g. less expensive), user preferences (e.g., customer prefers organic), promotional product, difference in size (e.g., bulk option of a product or alternative product, increased size may provide greater savings per unit of measure, serving, use, etc.), difference in size based on consumption rate, a higher quality product, other customer reviews, consumption rates, and the like. For example, pricing information may be obtained to purchase each of two alternative products (e.g., a first product and a second product), and it may be identified that the first product has a lower price than the second product.

The customer may be notified of the alternative product. In some instances, the central product tracking system or other system (e.g., marketing system) can cause a proposal to be communicated to the customer (e.g., a user interface unit 118) proposing the purchase of a first product of one or more alternative products and at least one reason of the one or more reasons to purchase the first product as an alternative to purchasing a second product identified to be replenished. For example, the central product tracking system may cause a communication to a user interface unit 118 and/or the product storage unit 104 regarding one or more potential alternative products and one or more corresponding reasons the alternative product was identified, such as identifying a cost savings.

Other factors may be considered in identifying alternative products. Some implementations may take into consideration dietary constraints. Similarly, a customer profile may identify one or more allergies of a customer or other family member, and such allergies may be considered in recommending a product, whether an alternative product be suggested, and/or whether one or more additional products are suggested. Other factors may be taken into account such as health issues and/or medications being taken (e.g., diabetic, high cholesterol, antibiotics, etc.). In some implementations, a customer profile may include medications and/or health issues associated with a customer and/or a family member. This information may be provided by a customer or may be obtained based on purchases, which may include purchases at a pharmacy of the shopping facility or related shopping facility. For example, some medications may recommend certain foods and/or ingredients be avoided while on the medication. Accordingly, the central product tracking system may take into consideration these issues when recommending a product be replenished and/or whether to recommend an alternative, companion and/or additional product.

Similarly, one or more products may be recommended in response to receiving product data from the product storage unit. For example, upon receiving a notice that a first product has been added to the product storage unit, the product tracking system and/or an inventory system may recommend a second product or multiple additional products that may be a companion product, a complement to the first product and/or be intended to be used with the first product. Some embodiments await authorization prior to making a purchase of the recommended products. In other instances, however, pre-authorization may have already be specified, such as in the customer profile.

As described herein, in some implementations, the central product tracking system 102 may communicate back to the product storage unit 104. The information communicated back may include substantially any relevant information corresponding to one or more products, the operation of the product storage unit, information provided by the product storage unit, customer information, preferences and/or other such information. In some instances, the central product tracking system provides product information, customer information, and/or other information to the product storage unit 104. For example, the central product tracking system may cause updated product information, corresponding to a product stored by the customer product storage unit, to be communicated over the distributed network to the customer product storage unit. The updated product information can include substantially any relevant information and/or may be in response to an evaluation of product data received from the product storage unit, based on purchases, etc.

Further, the updated product information may be configured to cause the customer product storage unit 104 to modify and/or update product information corresponding to one or more products locally stored at the customer product storage unit. Similarly, the central product tracking system may provide the same or similar information to a user interface unit of the customer, a central database that is used to populate one or more websites that may be accessed by the customer or a worker of the shopping facility, and the like. The updated product information may include a change in an expected expiration date, a change in predicted consumption rates (e.g., based on tracking consumption of a related product), a corrected product identifier, initial product weight information, a correction in product size and/or quantity, whether a product is recalled, or other such updated information. Other updated information may also be provided, such as updated customer information, system and/or software updates, product listing updates, product identifier updates, and the like. The updated information may be known based on what was purchased by a customer through the shopping facility and/or an associated facility or service (e.g., Internet site associated with a shopping facility), previous purchases, previous notifications by the customer or other customers regarding an incorrectly identified product, and/or other sources.

In some embodiments, the product storage unit can utilize the information provided by the central product tracking system in tracking products and/or product consumption. Further, the product storage system may use the information to confirm that a product was received at the product storage unit. For example, upon purchasing a product and/or receiving a notification that the customer purchased a product, corresponding product information can be communicated to the product storage unit. The product storage unit can then communicate a confirmation that the product was received.

The central product tracking system 102 may further provide customers with additional options in response to products being detected and/or tracked by the product storage unit 104. Some embodiments, for example, the product storage unit may communicate a notification that a product, which has not previously been detected by the customer product storage unit, has been positioned to be stored by the customer product storage unit. Typically, the notification includes an identifier of the product. The central product tracking system may, in response to receiving the notification that the product has been positioned to be stored by the customer product storage unit, provide the customer with one or more options that allow the customer to set one or more criteria corresponding to making a determination of whether the product is to be replenished. The one or more options may be provided through a user interface that is communicated over the distributed (e.g., via a web page), communicated to activate one or more options on a software application (APP) implemented on a portable user interface unit 118, communicated to the product storage unit that can be accessed through a user interface of the portable storage unit, or the like. The options can include, but are not limited to, allowing the customer to set an expiration, set one or more thresholds, set an authorization to replenish, to prevent automated replenishment, to associate a budget and/or priority relative to replenishing the product, specifying that a notification regarding the determination that the product should be replenished, and other such options. Customers can further access similar or the same options to set and/or modify parameters and/or settings corresponding to other products.

Again, in some embodiments, the central product tracking system takes into consideration limits prior to implementing one or more automated purchases. In some applications, the customer can specify one or more preset spending thresholds or caps. These thresholds may be specific to a particular type of payment, an overall spending threshold, duration for a spending threshold, an account may be set-up with funds that can be used for automated purchases, and other such thresholds. For example, a preset spending threshold may be designated regardless of what is in an account (e.g., promotional credits, gift card, credit card, debit, etc.). Additionally or alternatively, one or more thresholds may be specified for each available payment type (e.g., threshold on promotional credits, threshold on amount used from one or more gift cards, threshold on how much to apply to a credit card, threshold on how much to apply to a debit card, etc.).

In some implementations and/or based on some customer profiles, the central product tracking system 102, customer profile system, customer account system, and/or other such system that may be implemented as part of the central product tracking system or with which the central product tracking system is in communication (e.g., via network 106), can issue a notification and/or alert to a customer when funds in one or more payment methods and/or set thresholds are approached. The notifications can be proactive based on prior spending as well as reactive based upon products detected that may be in need of or will soon be in need of replenishment. The central product tracking system can further record automated purchases, purchases implemented by a customer, and/or continuously track fund usage as applied to one or more thresholds. The usage of available funds or thresholds over time typically decrease as products are purchased. Accordingly, the thresholds are often decreased in response to purchases being made and less funds being available. These thresholds continue to decrease until a reset is applied (e.g., based on time, purchase of products, etc.), a customer overrides a threshold, additional funds are made available that increase or reset thresholds, and the like. For example, a threshold may be set as a monthly threshold, a pay period threshold, weekly threshold, or other such duration. The duration of a threshold avoids funds used in purchasing products during a corresponding threshold duration does not exceed a specified threshold or budget. Different durations can be specified and/or set for different thresholds or budgets. Similarly, different thresholds may apply for specific products, for a group of products, for a product type and/or other such thresholds.

Further, the thresholds are updated in response to purchases being made (i.e., reducing available thresholds), thresholds are reset, a customer overrides or increases a threshold, additional funds are made available for use relative to the threshold, and the like. Similarly, a threshold may be reset based on a threshold duration being met (e.g., reset weekly, monthly, bi-monthly, etc.). As such, the thresholds can change over time, and the central product tracking system can evaluate the budgets and/or thresholds prior to authorizing a purchase and/or modify what is to be purchased (if anything) based on changes to the thresholds and/or budgets over time.

In determining whether to implement an automated purchase of one or more products to be replenished, the central product tracking system 102 may further evaluate one or more customer profiles and the potential items to purchase. In some embodiments, in addition to cost evaluation and/or separate from a cost evaluation, the potential products are prioritized. The prioritizing may be based on one or more factors, such as but not limited to rate of replenishment, consistency of replenishment, customers previous authorizations, other customers' prioritizing, other such factors, or combination of two or more of such factors. When taken into consideration in view of cost thresholds and/or spending thresholds, lower priority products may not be automatically purchased. In other instances, a notification may be communicated to the customer notifying the customer of approaching and/or reaching a threshold or thresholds. The customer may further be provided with options, such as but not limited to options that allow the user to authorize of one or more additional and/or alternative products (e.g., a product that costs less), an option requesting further authorization to exceed spending thresholds, option to add funds to be used for purchases, other such options, or combination of two or more options. Again, some embodiments further consider alternative products that may be purchased, such as less expensive products, alternative products on sale, smaller size of a product, and the like. In other instances, the purchase may be skipped and a notification sent to the customer. Further, the customer profile may designate one or more products that should be purchased even when such a purchase may exceed a threshold, and thus provide an express override of one or more thresholds. A notification may also identify products with a recommended priority. The customer may further be provided with one or more options allowing a customer to select one or more products that should be purchased, which may follow the recommended priority or override the priority. The priority may be based on past purchases, past overrides, customer preferences and the like, which may be tracked and updated in the user profile.

In some implementations, the central product tracking system 102 further receives notification and/or confirmation of fulfillment of a product determined in need of replenishment and/or purchased. The product storage unit 104 detects the new product being placed into the product storage unit and communicates the detection of the new product. In some instances, the product storage unit indicates the new product is newly received based on a notification from the central product storage system that the replenishment product had been purchased and should be received. Additionally or alternatively, a customer may notify the central product tracking system or other system in communication with the central product racking system that a product has been received. In some implementations, additional information about the replenished product may be received from the product storage unit and/or a customer, such as anticipated or determined expiration date, size, weight, quantity and/or other such information. The central product tracking system may provide the product storage unit with information about the product and/or override information about the product. For example, the central product tracking system may utilize expiration thresholds defined within a customer profile to modify an expiration date determined by the product tracking unit. Similarly, the product tracking system may modify a rate of consumption or other such information.

Typically, in initiating a product purchase, the central product tracking system may further determine whether a product is to be delivered to a customer or is to be held at a shopping facility to be picked up by the customer or a representative of the customer (e.g., spouse, child, etc.). In some instances, the customer profile is used to determine which products are to be delivered. For example, some customers may have specific instructions regarding one or more products and whether they are to be delivered. Similarly, a customer may have an enhanced membership that offers enhanced delivery (e.g., free shipping) and/or delivery within a given time period. Further, the determination of whether to deliver a product often depends on the product being purchased. For example, some products may need to be frozen or refrigerated, and as such, delivery of such products may be prevented or limited. In some instances, delivery of such products may be implemented relative to a schedule identified in a customer profile (e.g., customer requests refrigerated items be delivered after 6:00 PM when a customer is likely to be home). As such, the central product tracking system can identify those products to be delivered and implement the purchase and delivery. Similarly, those products to be picked up can be purchased, and a shopping facility associate can be notified to move an item of the product to a designated area awaiting pickup by the customer. The customer may further be notified when a product has been purchased, delivered and/or is awaiting pickup. The customer profile may designate other special instructions for delivery, and such instructions may be product specific. The central product tracking system may communicate these special instructions and/or other instructions to a distribution center and/or shipping facility or company.

In some instances for products to be picked up, the central product tracking system may detect that a product designated to be picked up has not been picked up within a threshold pickup time. With some products this expiration of the threshold pickup time may cause the central product tracking system to notify the customer, and may additionally or alternatively cause a notification to a shopping facility associate to replace the product that was set aside with a newer item of the product (e.g., replace milk after a day).

Accordingly, some embodiments provide customers with product information, product status information, track product consumption, and automatically purchase products on behalf of a customer. The product status information can include remaining estimated quantity, consumption rate, expected date product will be fully consumed, shelf life, pricing, alternative product information, additional and/or companion product information, other such information, or a combination of two or more of such information. In some embodiments, the product storage unit includes a smart interface that allows the product storage unit to identify product data and/or communicate the information to the central product tracking system 102, one or more user interface units 118, a remote computer and/or other such device. Accordingly, the central product tracking system can identify products that have been consumed and in need of being replenished and/or predict when products are going to be consumed and in need of being replenished. Similarly, the user interface units 118 (e.g., smart phone, personal computer, tablet, etc.) may be provided with information from the central product tracking system regarding product replenishment, purchasing, status information, statistics, financial resources available, and the like. Similarly, in some implementations, the user interface units and/or personal computers may additionally be configured to receive and evaluate relevant information to make similar determinations regarding consumption. Further, the central product tracking system is configured to implement automatic purchases and/or determine when to replenish one or more products. The decision to purchase and/or when to purchase may be based upon customer set tolerances and/or thresholds. Customers may be able to set aside a special credit or prepaid account by which the central product tracking system can use to purchase new products.

In some embodiments, a product storage unit interface interfaces between a product storage unit, one or more smart devices, personal computers, central computer, shopping facility computer system, central product tracking system, and/or other such systems. The interface can include one or more communication interfaces providing communication between the product storage unit and one or more of the central product tracking system, user interface unit, personal computer, and the like. The central product tracking system can be configured to maintain customer profiles, which may include preferences, habits, limits, thresholds, authorizations, priorities, behaviors, and/or other such information. Threshold and/or tolerances may be set for replenishment based upon, for example, quantity, time, historical usage, expiration, current usage rate, and the like. Automation of replenishment can use credit, prepaid, or debit account. Some embodiments further generate management reports, which may be used at least in part for evaluations, such as program usage and success evaluations.

The described features, structures, or characteristics of the invention may be combined in any suitable manner in one or more embodiments. In the following description, numerous specific details are provided. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention. The embodiments shown in the drawings, if any, and as described above are merely for illustrative purposes and not intended to limit the scope of the invention. Moreover, those skilled in the art will recognize that a wide variety of modifications, alterations, and combinations can be made with respect to the above described embodiments without departing from the scope of the invention as set forth in the claims, and that such modifications, alterations, and combinations are to be viewed as being within the ambit of the inventive concept.

What is claimed is:

1. A product tracking and purchasing apparatus, comprising:
    a transceiver configured to couple with and receive communications from over a distributed network;
    a control circuit coupled with the transceiver; and
    a memory coupled to the control circuit and storing computer instructions that when executed by the control circuit cause the control circuit to:
        receive, through the transceiver and from over a distributed network, multiple product data from a restockable customer product storage unit located at a remote customer residence, wherein each of the multiple product data comprises product tracking information corresponding to one of multiple consumable products tracked over time by the product storage unit of the multiple products stored by and detected by the product storage unit;
        receive a set of customer specified thresholds corresponding to a set of products associated with the customer residence;
        override predefined thresholds corresponding to the set of products with the customer specified thresholds and incorporate the customer specified thresholds into a customer profile associated with the customer residence;
        evaluate each of the multiple product data relative to one or more thresholds, comprising the customer specified thresholds, within the customer profile associated with the customer residence;
        update the customer profile associated with the customer residence in response to each modification in product information associated with the customer residence;
        identify, based on the evaluation of each of the product data, one or more products of the multiple consumable products to be replenished as a function of the updated customer profile;
        automatically cause a purchase, on behalf of a customer associated with the customer residence, of at least a first product to replenish at least one of the one or more products to be replenished;
        obtain payment from a source associated with the customer for at least the first product purchased;
        cause a notification of the purchase of the first product to be communicated to the product storage unit in response to causing the purchase of the first product, wherein the notification identifies the first product;
        receive, through the transceiver and from over the distributed network, replenish product data from the product storage unit confirming receipt of at least the first product purchased, wherein the receipt of the replenish product data is received in response to the notification that the first product was purchased and the product storage unit detecting the purchased first product being added to the product storage unit; and
        update product information for at least the first product, in response to receiving the replenish product data confirming receipt of the first product, to include an increased quantity of the first product corresponding to the quantity of the purchased first product.

2. The apparatus of claim 1, wherein the control circuit in identifying the one or more products to be replenished is configured to identify a second product to be replenished, and the control circuit is further configured to:
    identify one or more alternative products available to be purchased as an alternative to purchasing the second product identified to be replenished, wherein the one or more alternative products includes the first product;
    obtain one or more reasons why each of the one or more alternative products may be purchased as the alternative to purchasing the second product; and
    cause a proposal to be communicated to the customer proposing the purchase of at least the first product of the one or more alternative products and at least one reason of the one or more reasons to purchase the first product as an alternative to purchasing the second product.

3. The apparatus of claim 2, wherein the control circuit, in obtaining the one or more reasons to purchase at least the first product as the alternative to purchasing the second product, is further configured to obtain pricing information to purchase each of the first product and the second product, and identify that the first product has a lower price than the second product.

4. The apparatus of claim 1, wherein the control circuit is further configured to:
cause additional updated product information, corresponding to a second product stored by the product storage unit, to be communicated over the distributed network to the product storage unit, wherein the additional updated product information is configured to cause the product storage unit to update at the product storage unit locally stored product information corresponding to the second product.

5. The apparatus of claim 1, wherein the control circuit is further configured to:
receive a notification from the product storage unit that a second product, which has not previously been detected by the product storage unit, has been positioned to be stored by the product storage unit, wherein the notification comprises an identifier of the second product; and
providing, in response to receiving the notification that the second product has been positioned to be stored by the product storage unit, the customer with one or more options that allow the customer to set one or more criteria corresponding to making a determination of whether the second product is to be replenished.

6. The apparatus of claim 1, wherein the control circuit is further configured to:
tracking changes of weight of product in predicting consumption rate;
wherein the control circuit in receiving the product data receives over time multiple different consumption information from the product storage unit corresponding to the first product, wherein each of the multiple consumption information comprising an identification of the first product removed from the product storage unit and subsequently returned to the first product storage unit, and a change in weight of the first product between the removal and the return of the first product detected by at least one weight sensor of the product storage unit; and
wherein the control circuit, in identifying the one or more products of the multiple consumable products to be replenished, is configured to determine a rate of consumption rate based on the changes in weight corresponding to the first product received over time, anticipate when the first product is expected to be fully consumed based on the rate of consumption, and select the first product based on the determined anticipation of when the first product is expected to be fully consumed.

7. The apparatus of claim 1, wherein the control circuit is further configured to:
receive additional product data from the product storage unit corresponding to a second product that the product storage unit cannot identify;
determine that the control circuit is unable to identify based on the additional product data the second product; and
cause the product storage unit to query the customer requesting the customer to provide identifying information of the second product.

8. The apparatus of claim 1, wherein the control circuit is further configured to:
receive an identification of a second product removed from the product storage unit;
determine that the second product has not been returned to the product storage unit within a threshold time period corresponding to the second product;
designate that the second product has been fully consumed based on the second product not having been returned to the product storage unit within the threshold period of time; and
identify the second product as one of the one or more products of the multiple consumable products to be replenished based on the designation that the second product as having been fully consumed.

9. The apparatus of claim 1, wherein the control circuit is further configured to:
identify that there are multiple different budgets associated with the customer residence based on different types of products;
determine, based on an identification of the first product, that the first product corresponds to a first budget of the multiple different budgets; and
confirm, prior to causing the purchase of the first product, that the purchase of the first product will not exceed the first budget.

10. The apparatus of claim 9, wherein the control circuit is further configured to:
wherein the control circuit in identifying the one or more products of the multiple consumable products to be replenished is configured to identify a second product to be replenished;
determine, based on an identification of the second product, that the second product corresponds to the first budget of the multiple different budgets;
identify that the purchase of both the first product and the second product would exceed the first budget;
identify that the first product is prioritized over the second product; and
prevent the purchase of the second product based on the first budget expected to be exceeded and the priority of the first product over the second product.

11. The apparatus of claim 1, wherein the control circuit is further configured to:
determine, based on an identification of the first product, that the first product corresponds to a first budget;
identify that the purchase of the first product would exceed the first budget;
identify, from the customer profile corresponding to the customer residence, an express override of the first budget corresponding to the first product, wherein the express override designates that the first product should be purchased even though the purchase of the first product is expected to exceed the first budget;
wherein the control circuit, in causing the purchase of at least the first product, is configured to cause the purchase of at least the first product based on the express override of the first budget corresponding to the first product.

12. A method of purchasing products on behalf of customers, comprising:
by a control circuit of a product tracking system:
receiving, through a transceiver and from over a distributed network, multiple product data from a restockable customer product storage unit located at a remote customer residence, wherein each of the multiple product data comprises product tracking information corresponding to one of multiple consumable products tracked over time by the product storage unit of the multiple products stored by and detected by the product storage unit;
receiving a set of customer specified thresholds corresponding to a set of products associated with the customer residence;

overriding predefined thresholds corresponding to the set of products with the customer specified thresholds and incorporating the customer specified thresholds into a customer profile associated with the customer residence;

evaluating each of the multiple product data relative to one or more thresholds within an updated customer profile associated with the customer residence;

updating the customer profile associated with the customer residence in response to modifications in product information associated with the customer residence;

identifying, based on the evaluation of each of the product data, one or more products of the multiple consumable products to be replenished as a function of the updated customer profile;

automatically causing a purchase, on behalf of a customer associated with the customer residence, of at least a first product to replenish at least one of the one or more products to be replenished;

obtaining payment from a source associated with the customer for at least the first product purchased;

causing a notification of the purchase of the first product to be communicated to the product storage unit in response to causing the purchase of the first product, wherein the notification identifies the first product;

receiving, through the transceiver and from over the distributed network, replenish product data from the product storage unit confirming receipt of at least the first product purchased, wherein the receipt of the replenish product data is received in response to the notification that the first product was purchased and the product storage unit detecting the purchased first product being added to the product storage unit; and updating product information for at least the first product, in response to receiving the replenish product data confirming receipt of the first product, to include an increased quantity of the first product corresponding to the quantity of the purchased first product.

13. The method of claim 12, wherein the identifying the one or more products to be replenished comprises:

identifying one or more alternative products available to be purchased as an alternative to purchasing a second product identified in the identifying the one or more products to be replenished, wherein the one or more alternative products includes the first product;

obtaining one or more reasons why each of the one or more alternative products may be purchased as the alternative to purchasing the second product; and causing a proposal to be communicated to the customer proposing the purchase of at least the first product of the one or more alternative products and at least one reason of the one or more reasons to purchase the first product as an alternative to purchasing the second product.

14. The method of claim 13, wherein the obtaining the one or more reasons to purchase at least the first product as the alternative to purchasing the second product further comprises obtaining pricing information to purchase each of the first product and the second product, and identifying that the first product has a lower price than the second product.

15. The method of claim 12, further comprising:

causing additional updated product information, corresponding to a second product stored by the product storage unit, to be communicated over the distributed network to the product storage unit, wherein the additional updated product information is configured to cause the product storage unit to update at the product storage unit locally stored product information corresponding to the second product.

16. The method of claim 12, further comprising:

receiving a notification from the product storage unit that a second product, which has not previously been detected by the product storage unit, has been positioned to be stored by the product storage unit, wherein the notification comprises an identifier of the second product; and providing, in response to receiving the notification that the second product has been positioned to be stored by the product storage unit, the customer with one or more options that allow the customer to set one or more criteria corresponding to making a determination of whether the second product is to be replenished.

\* \* \* \* \*